United States Patent
Seo et al.

(10) Patent No.: US 12,145,092 B2
(45) Date of Patent: Nov. 19, 2024

(54) AIR CONDITIONER

(71) Applicant: SAMSUNG ELECTRONICS CO., LTD., Gyeonggi-do (KR)

(72) Inventors: Yongho Seo, Suwon-si (KR); Gahyun Kim, Suwon-si (KR); Nakhyun Kim, Suwon-si (KR); Juyoung Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 469 days.

(21) Appl. No.: 17/545,305

(22) Filed: Dec. 8, 2021

(65) Prior Publication Data

US 2022/0146120 A1 May 12, 2022

Related U.S. Application Data

(63) Continuation of application No. PCT/KR2021/013557, filed on Oct. 5, 2021.

(30) Foreign Application Priority Data

Nov. 11, 2020 (KR) .......................... 10-2020-0150518

(51) Int. Cl.
*B01D 53/22* (2006.01)
*B01D 46/00* (2022.01)
(Continued)

(52) U.S. Cl.
CPC ..... *B01D 46/0039* (2013.01); *B01D 46/0002* (2013.01); *F04D 29/667* (2013.01);
(Continued)

(58) Field of Classification Search
CPC ........ F24F 1/0018; F24F 1/0071; F24F 13/20; F24F 13/24; F24F 13/081; F04D 29/667; B01D 46/0039; B01D 46/0002
See application file for complete search history.

(56) References Cited

U.S. PATENT DOCUMENTS

| | | | | |
|---|---|---|---|---|
| 4,800,735 A | * | 1/1989 | Lang | F24F 13/20 62/262 |
| 5,943,873 A | * | 8/1999 | Chung | F24F 13/20 62/262 |

(Continued)

FOREIGN PATENT DOCUMENTS

| | | |
|---|---|---|
| DE | 20 2016 104 126 U1 | 9/2016 |
| EP | 1 873 461 B1 | 10/2011 |

(Continued)

OTHER PUBLICATIONS

Space <https://www.thefreedictionary.com/space> 1 page Collins English Dictionary—Complete and Unabridged, 12th Edition 2014 HarperCollins Publishers (Year: 2014).*

(Continued)

*Primary Examiner* — Anthony R Shumate
(74) *Attorney, Agent, or Firm* — STAAS & HALSEY LLP

(57) ABSTRACT

An air conditioner includes a main body, a fan configured to form an airflow inside the main body, a motor including a shaft to which the fan is coupled, and a motor cover to which the motor is fixed. The motor cover includes a body including a rear surface formed in a truncated cone shape, and a vortex breaker which protrudes toward the fan from the rear surface body along an outer periphery of the body, so as to prevent air, which is discharged from the fan, from forming a vortex.

15 Claims, 8 Drawing Sheets

(51) Int. Cl.
 *F04D 29/66* (2006.01)
 *F24F 1/0018* (2019.01)
 *F24F 13/08* (2006.01)
 *F24F 13/20* (2006.01)
 *F24F 13/24* (2006.01)
 *F24F 1/0071* (2019.01)

(52) U.S. Cl.
 CPC .......... *F24F 1/0018* (2013.01); *F24F 13/081* (2013.01); *F24F 13/20* (2013.01); *F24F 13/24* (2013.01); *F24F 1/0071* (2019.02)

(56) References Cited

U.S. PATENT DOCUMENTS

| | | | |
|---|---|---|---|
| 10,591,170 B2 | 3/2020 | Lee et al. | |
| 11,022,338 B2 | 6/2021 | Chun et al. | |
| 2008/0034775 A1* | 2/2008 | Choi | F24F 1/0014 62/259.1 |
| 2008/0035317 A1* | 2/2008 | Choi | F24F 1/0063 165/125 |
| 2011/0138844 A1* | 6/2011 | Yamada | F24F 13/20 62/419 |
| 2011/0138845 A1* | 6/2011 | Hayashi | F24F 1/0063 62/419 |
| 2011/0312264 A1* | 12/2011 | Kim | F24F 1/50 454/338 |
| 2014/0096941 A1 | 4/2014 | Yun et al. | |
| 2016/0045984 A1* | 2/2016 | Matsumoto | B23K 26/38 219/121.72 |
| 2017/0033642 A1 | 2/2017 | Chou | |
| 2019/0024909 A1 | 1/2019 | Lee et al. | |
| 2021/0215355 A1* | 7/2021 | Fuse | F24F 1/0018 |
| 2022/0003432 A1 | 1/2022 | Chen et al. | |

FOREIGN PATENT DOCUMENTS

| | | |
|---|---|---|
| EP | 3 113 332 A1 | 1/2017 |
| JP | 3764442 B2 | 4/2006 |
| JP | 2013-88023 | 5/2013 |
| JP | 2019-15456 | 1/2019 |
| JP | 70709792 | 6/2022 |
| KR | 10-2002-0076611 | 10/2002 |
| KR | 10-2014-0015945 | 2/2014 |
| KR | 10-2018-0129074 | 12/2018 |
| KR | 10-2019-0010395 | 1/2019 |
| KR | 10-2019-0086251 | 7/2019 |
| KR | 10-2053227 | 12/2019 |
| WO | WO 2015/025498 A1 | 2/2015 |

OTHER PUBLICATIONS

Extended European Search Report dated Nov. 24, 2023 in European Patent Application No. 21892139.3.
PCT/ISA/210 dated Jan. 26, 2022 in related International Patent Application No. PCT/KR2021/013557.

* cited by examiner

AIR CONDITIONER

CROSS REFERENCE TO RELATED APPLICATIONS

This application is a continuation application under 35 U.S.C. § 111(a) of International Application No. PCT/KR2021/013557, filed on Oct. 5, 2021, which claims priority to Korean Patent Application No. 10-2020-0150518 filed on Nov. 11, 2020. The disclosures of International Application No. PCT/KR2021/013557 and Korean Patent Application No. 10-2020-0150518 are incorporated by reference herein in their entirety.

BACKGROUND

1. Field

The disclosure relates to an air conditioner, and for example, to an air conditioner including a structure configured to minimize flow loss and flow noise.

2. Description of the Related Art

An air conditioner is a device that sucks indoor air, conditions the sucked air, and then discharges the conditioned air. In this case, air conditioning refers to appropriately controlling the temperature, humidity, cleanliness, airflow distribution, etc. of indoor air. The type of the air conditioner may include a ventilation device, a cooling and heating device, an air purifier, a humidifier, and the like.

An air purifier, which is an example of an air conditioner, is a device used to control the cleanliness of indoor air by removing pollutants in the air. The air purifier may remove bacteria, viruses, mold, fine dust, and chemicals that cause bad odors in the sucked air.

The air purifier may be provided with a filter for purifying polluted indoor air. The air sucked by the air purifier may be purified as clean air by removing contaminants while passing through the filter, and the purified air may be discharged to the outside of the air purifier. Meanwhile, recently, a cooling and heating device, which is an example of an air conditioner, may also include a filter unit to perform an air cleaning function.

The air conditioner may include a fan for sucking and discharging air, and may include various blowing structures for guiding air discharged by the fan to an outlet of the air conditioner.

On the other hand, by the fan or the blowing structure, a vortex may be formed on an air flow path inside the air conditioner. When a vortex is formed, flow loss and flow noise may occur, and thus it is required to prevent or reduce the formation of a vortex.

SUMMARY

An aspect of the disclosure provides an air conditioner including a main body, a fan configured to form an airflow inside the main body, a motor including a shaft to which the fan is coupled, and a motor cover to which the motor is fixed. The motor cover may include a body including a rear surface formed in a truncated cone shape, and a vortex breaker which protrudes toward the fan from the rear surface of the body along an outer periphery of the body, so as to prevent air, which is discharged from the fan, from forming a vortex.

The body may form an accommodation space in which the motor is accommodated, and the motor cover may include a cover panel coupled to one side of the body to cover the accommodation space, and the cover panel may include an airflow guide formed on an outer peripheral side of the cover panel to guide air passing through the vortex breaker to an outlet of the main body.

The motor cover may form an air flow path to guide air, which is discharged from the fan, to the outlet, and the motor cover may include a guide vane formed on an outer peripheral surface of the body and disposed on the air flow path so as to stabilize an air flow. The vortex breaker may be disposed further upstream of the air flow path than the guide vane, and the airflow guide may be disposed further downstream of the air flow path than the guide vane.

The vortex breaker and the airflow guide may be formed in a ring shape. That is, the vortex breaker and the airflow guide may be ring-shaped.

The guide vane may extend in a radial direction from the outer peripheral surface of the body.

A shortest distance between the vortex breaker and the fan in a direction parallel to the shaft may be greater than or equal to 2 mm, and less than or equal to 10 mm.

A difference between a shortest distance between a coupling portion center of the shaft and the vortex breaker, and a distance between the coupling portion center of the shaft and one end of the fan adjacent to the vortex breaker, may be greater than or equal to 2 mm, and less than or equal to 10 mm.

The airflow guide may include a curved surface which extends in a radial direction of the cover panel, and the curved surface may curve away from the fan with respect to a direction parallel to the shaft.

A width of the airflow guide in the direction parallel to the shaft may be greater than or equal to 5 mm.

The cover panel may include a plate portion to cover an opening of the accommodation space exposed to the outside, and the airflow guide may extend along an outer periphery of the plate portion and be connected to the plate portion.

The accommodation space may include a motor accommodating portion in which the motor is mounted, and a heat dissipation flow path portion provided to connect the motor accommodating portion to the opening to discharge heat generated from the motor. The motor cover may include a support panel to support the motor and to define the motor accommodating portion and the heat dissipation flow path portion.

The support panel may include a communication hole to allow the motor accommodating portion and the heat dissipation flow path portion to communicate with each other, and the cover panel may include a heat dissipation hole formed in the plate portion.

The plate portion may cover 75% or more of an area of the opening.

The main body may further include a fan case in which the fan is disposed, and the motor cover may be coupled to the fan case.

The motor cover may form the air flow path together with the fan case.

Another aspect of the disclosure provides an air conditioner including a case in which an outlet is provided in front, and a fan assembly arranged in the case and configured to discharge air to a front side. The fan assembly includes a fan, a vortex breaker arranged in front of the fan and formed in a ring shape so as to prevent a vortex from being formed by the fan, and an airflow guide formed in a ring shape and arranged in front of the vortex breaker so as to guide air to the outlet.

The fan assembly may further include a guide vane arranged in a front and rear direction between the vortex breaker and the airflow guide.

The fan assembly may include the vortex breaker and the guide vane, and the fan assembly may include a cover bracket fixed to the case, and a cover panel coupled to the cover bracket and in which the airflow guide is formed.

The fan assembly may further include a motor configured to drive the fan, and the motor may be fixed to the cover bracket.

Another aspect of the disclosure provides an air conditioner including a case, a fan arranged in the case, a motor coupled to the fan and configured to drive the fan, and a motor cover to which the motor is coupled, the motor cover fixed to the case. The motor cover includes a body provided to form a motor accommodating portion in which the motor is accommodated, and a vortex breaker provided to protrude toward the fan from a rear surface of the body to prevent a vortex from being formed by the fan, the vortex breaker formed in a ring shape along an outer periphery of the body.

DETAILED DESCRIPTION

Figure 1:
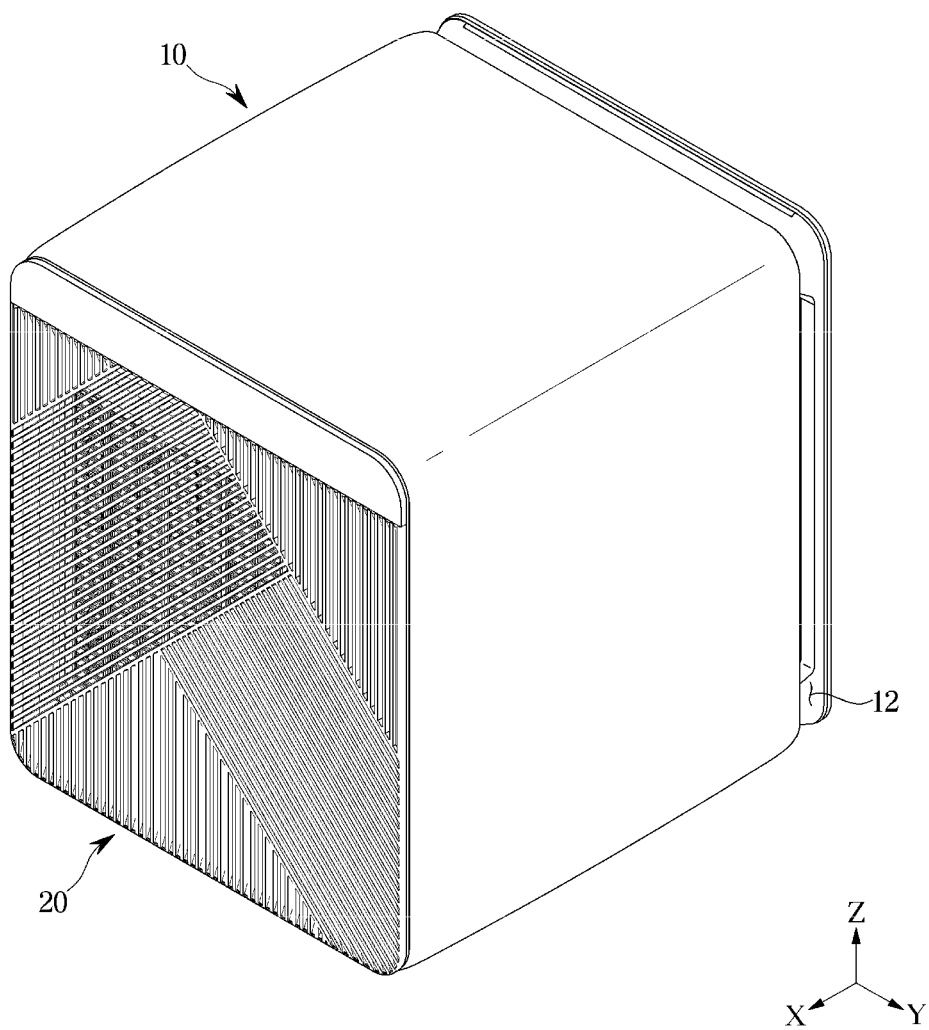
FIG. 1 is a perspective view of an air purifier according to an embodiment of the disclosure.

Embodiments described in the disclosure and configurations shown in the drawings are merely examples of the embodiments of the disclosure, and may be modified in various different ways to replace the embodiments and drawings of the disclosure.

In addition, the same reference numerals or signs shown in the drawings of the disclosure indicate elements or components performing substantially the same function.

Also, the terms used herein are used to describe the embodiments and are not intended to limit and/or restrict the disclosure. The singular forms "a," "an" and "the" are intended to include the plural forms as well, unless the context clearly indicates otherwise. In this disclosure, the terms "including", "having", and the like are used to specify features, numbers, steps, operations, elements, components, or combinations thereof, but do not preclude the presence or addition of one or more of the features, elements, steps, operations, elements, components, or combinations thereof.

It will be understood that, although the terms first, second, third, etc., may be used herein to describe various elements, the elements are not limited by these terms. These terms are only used to distinguish one element from another element. For example, without departing from the scope of the disclosure, a first element may be termed as a second element, and a second element may be termed as a first element.

The term of "and/or" includes a plurality of combinations of relevant items or any one item among a plurality of relevant items. For example, the scope of the expression or phrase "A and/or B" includes all of the following: (1) the item "A", (2) the item "B", and (3) the combination of items "A and B".

In addition, the scope of the expression or phrase "at least one of A and B" is intended to include all of the following: (1) at least one of A, (2) at least one of B, and (3) at least one A and at least one of B. Likewise, the scope of the expression or phrase "at least one of A, B, and C" is intended to include all of the following: (1) at least one of A, (2) at least one of B, (3) at least one of C, (4) at least one of A and at least one of B, (5) at least one of A and at least one of C, (6) at least one of B and at least one of C, and (7) at least one of A, at least one of B, and at least one of C.

When it is stated in the disclosure that one element is "connected to" or "coupled to" another element, the expression encompasses an example of a direct connection or direct coupling, as well as a connection or coupling with another element interposed therebetween.

As used in the following description, the terms "front", "rear", "left" and "right" are defined based on the drawings, and the shape and position of each component is not limited by these terms. When referring to the coordinate axes shown in the drawings, an X-axis represents a front and back direction, a Y-axis represents a left and right direction, and a Z-axis represents an up and down direction. On the other hand, a direction parallel to a XY plane, such as the front and rear direction or the left and right direction, may be referred to as a horizontal direction. If it is parallel to the XY plane, it may represent that it is horizontal. If it is perpendicular to the XY plane, it may represent that it is a vertical direction.

One or more aspects of the disclosure are directed to providing an air conditioner capable of achieving blowing efficiency and noise reduction by preventing or reducing the formation of a vortex.

One or more aspects of the disclosure are directed to providing an air conditioner capable of increasing an air purification performance by increasing an amount of air discharged from the air conditioner.

According to examples described herein, an air conditioner may include a vortex breaker and an airflow guide to prevent or reduce the formation of a vortex, and to minimize the blowing efficiency reduction and the generation of the noise caused by the vortex.

According to examples described herein, an air conditioner may increase an amount of air discharged from an outlet, and improve the performance of air conditioning because air is guided to the outlet of the air conditioner by a cover panel provided with an airflow guide.

In addition, in the following, an air purifier, which is a type of air conditioner, will be described as an example for convenience of description, but a configuration of the disclosure for increasing flow efficiency and reducing flow noise by preventing or reducing the formation of a vortex is not limited thereto, and thus the configuration thereof may be appliable to other air conditioner. For example, the configuration thereof may also be applicable to a cooling and heating device, which is a type of air conditioner other than an air purifier. Because the air purifier is included in the air conditioner, the air purifier described below may be replaced with the air conditioner. Further, the configuration thereof may be applicable to home appliances in which a fan is driven and a flow path, in which air discharged by the fan flows, is provided.

Figure 2:
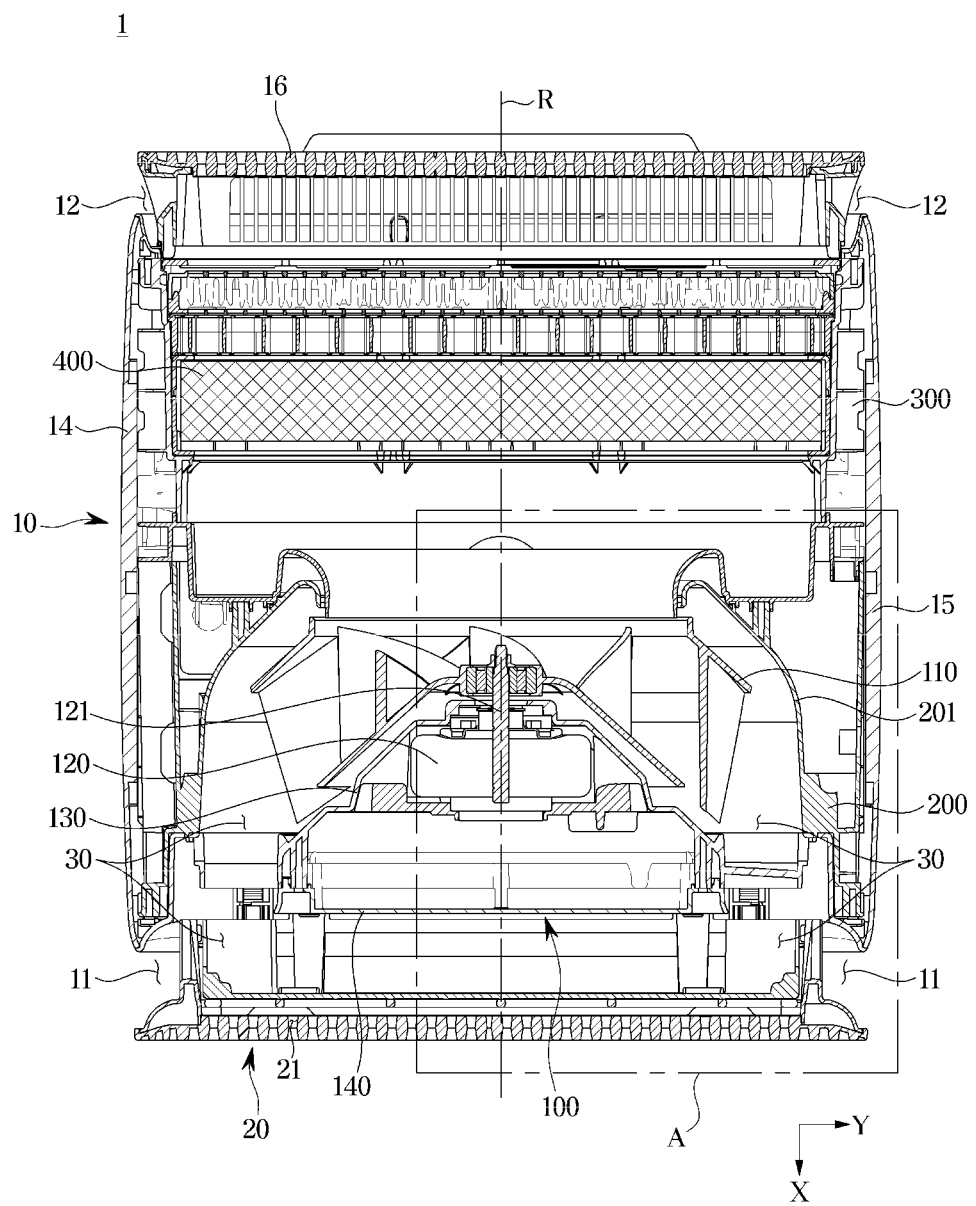
FIG. 2 is a cross-sectional view of the air purifier shown in FIG. 1.
Figure 3:
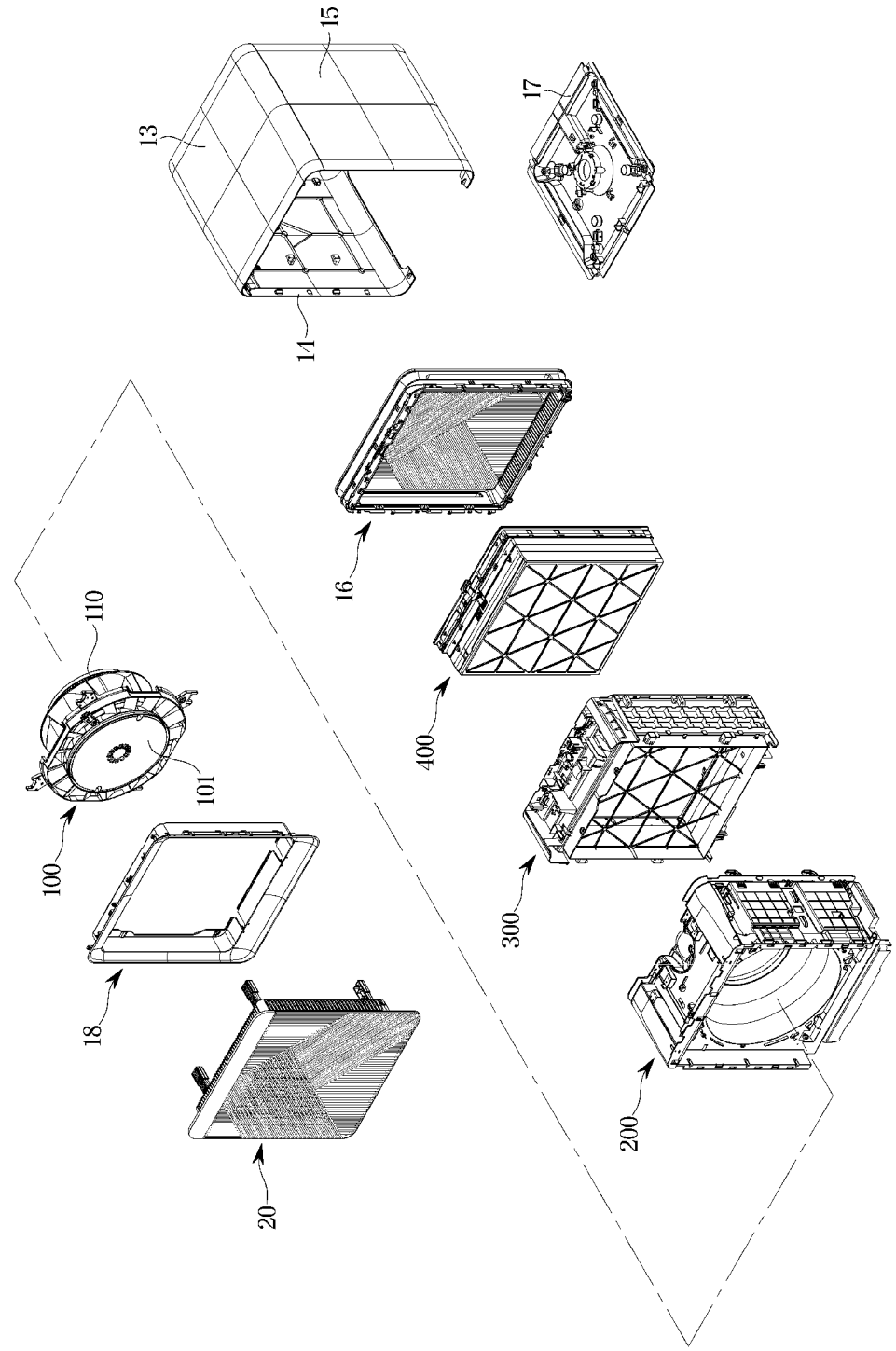
FIG. 3 is an exploded perspective view of the air purifier shown in FIG. 1.

Hereinafter example embodiments of the disclosure will be described in detail with reference to the accompanying drawings FIG. 1 is a perspective view of an air purifier according to one embodiment of the disclosure. FIG. 2 is a cross-sectional view of the air purifier shown in FIG. 1. FIG. 3 is an exploded perspective view of the air purifier shown in FIG. 1.

Referring to FIGS. 1 to 3, an air purifier 1 may include a main body 10 in a box-shape.

The main body 10 may include a cabinet provided to form an exterior. The cabinet may include an upper cabinet 13, a left cabinet 14, a right cabinet 15, and a lower cabinet 17. The main body 10 may include a rear panel 16 on which an inlet 12 is formed. The main body 10 may include an edge panel 18 provided to form a rim of a front surface of the main body 10 that is opened.

The upper cabinet 13, the left cabinet 14, and the right cabinet 15 may be integrally formed with each other. The upper cabinet 13, the left cabinet 14, the right cabinet 15, and the lower cabinet 17 may be arranged sequentially so as to form an upper surface, a left surface, a right surface, and a lower surface of the main body 10. The rear panel 16 may form a rear surface of the main body 10.

The air purifier 1 may include the inlet 12 formed in the main body to allow outside air to flow inside the air purifier 1, and an outlet 11 formed in the main body 10 to allow the air, which is introduced through the inlet 12, to be discharged. The inlet 11 and the outlet 12 may be formed on different surfaces or may be formed on the same surface. The inlet 12 may be formed on a rear end side of the main body 10. The outlet 11 may be formed on a front end side of the main body 10.

The air purifier 1 may include a filter unit 400 and a fan assembly 100 disposed inside the main body 10. The fan assembly 100 may suck the outside air to the inside of the main body 10 through the inlet 12 and pass the sucked air through the filter unit 400, and then discharge air, which is filtered by the filter unit 400, to the outside of the main body 10 through the outlet 11. The filter unit 400 may purify air, which is sucked through the inlet 12, and be removably installed in the main body 10.

The main body 10 may include a filter case 300 to which the filter unit 400 is mounted. The main body 10 may include a fan case 200 in which the fan assembly 100 is accommodated and to which the fan assembly 100 is fixed.

The fan case 200 may include an inner wall 201 that forms an air flow path 30 provided to guide the airflow formed by the fan assembly 100 to the outlet 11 provided in the front of the fan case 200. The fan 110 may be covered by the inner wall 201. The filter case 300 may be disposed at the rear of the fan case 200. The filter case 300 and the fan case 200 may be covered by the cabinet. On the other hand, the air flow path 30 may be defined as a flow path that is formed from the inlet 12 of the air purifier 1 to the outlet 11 of the air purifier 1 or to a fine outlet 21, and in which air, which is moved by the fan assembly 100, flows.

The air purifier 1 may include a panel 20 provided to be movable with respect to the main body 10 so as to adjust the size of the outlet 11. The panel 20 may be disposed in a front portion of the main body 10. The panel 20 may form the front surface of the air conditioner 1.

In response to the panel 20 being moved forward by a predetermined distance, the size of the outlet 11 may be increased. In response to the panel 20 being moved backward by a predetermined distance in a state of being moved forward by a predetermined distance, the size of the outlet 11 may be reduced.

In other words, the outlet 11 may correspond to a gap between the panel 20 and the main body 10. Accordingly, as the panel 20 and the main body 10 are away from each other, the size of the outlet 11 may be increased, and as the panel 20 and the main body 10 are close to each other, the size of the outlet 11 may be reduced. When the panel 20 and the main body 10 come into contact with each other, the outlet 11 may be closed and the air may be discharged to the outside of the air purifier 1 through the plurality of fine outlets 21 formed in the panel 20. Because an area of each of the plurality of fine outlets 21 is less than an area of the outlet 11, the air passing through the fine outlets 21 may be discharged at a lower speed than the air passing through the outlet 11. On the other hand, all or a portion of the air flow path 30 may be provided inside the main body 10. A portion of the air flow path 30 may be provided between the main body 10 and the panel 20.

However, the disclosure is not limited thereto. The panel 20 may be fixed immovably in the front portion of the main body 10, and the outlet 11 may be formed in the panel 20 or the main body 10. The panel 20 and the main body 10 may be provided integrally with each other.

Figure 4:
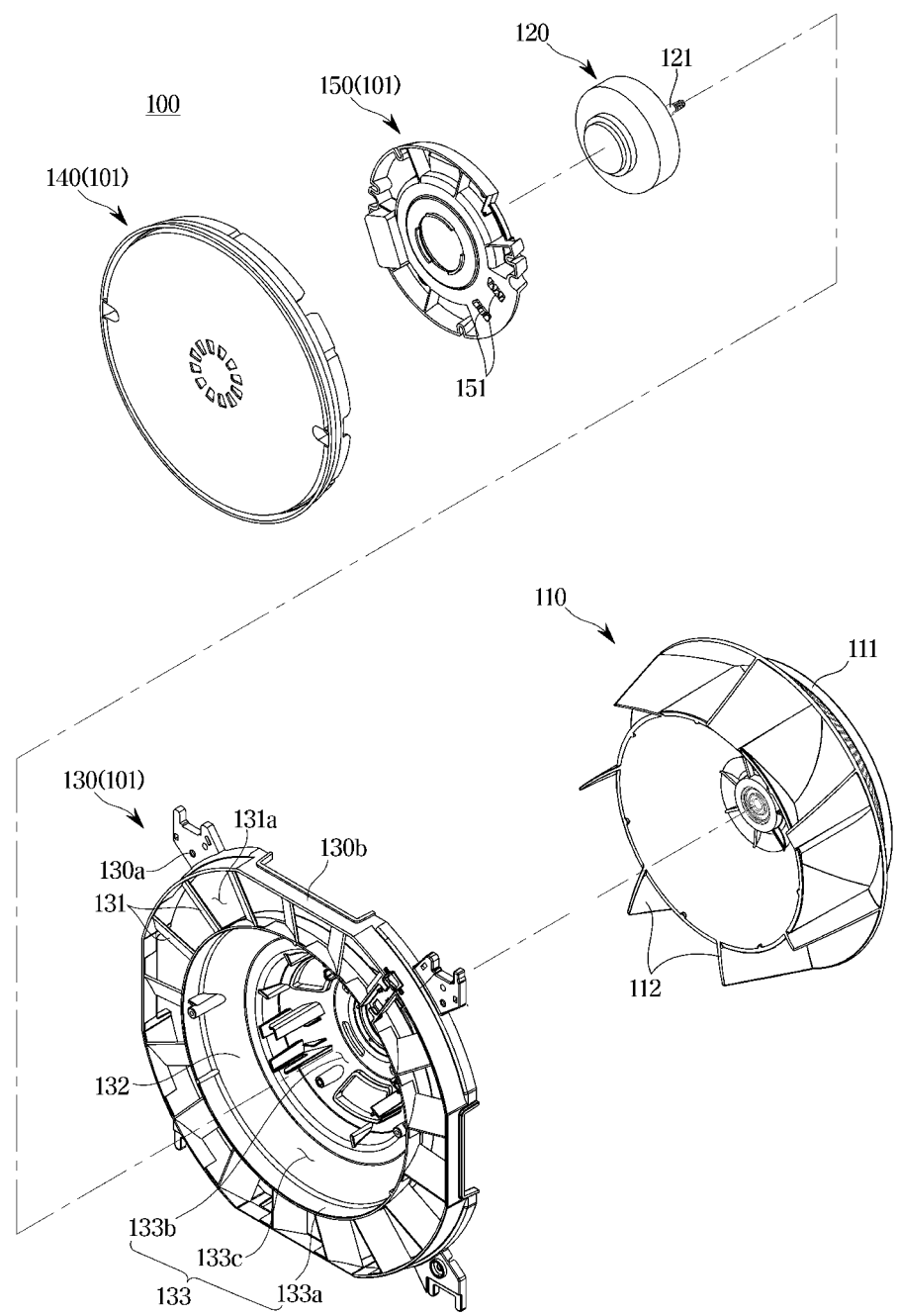
FIG. 4 is an exploded view of a fan assembly shown in FIG. 3.
Figure 5:
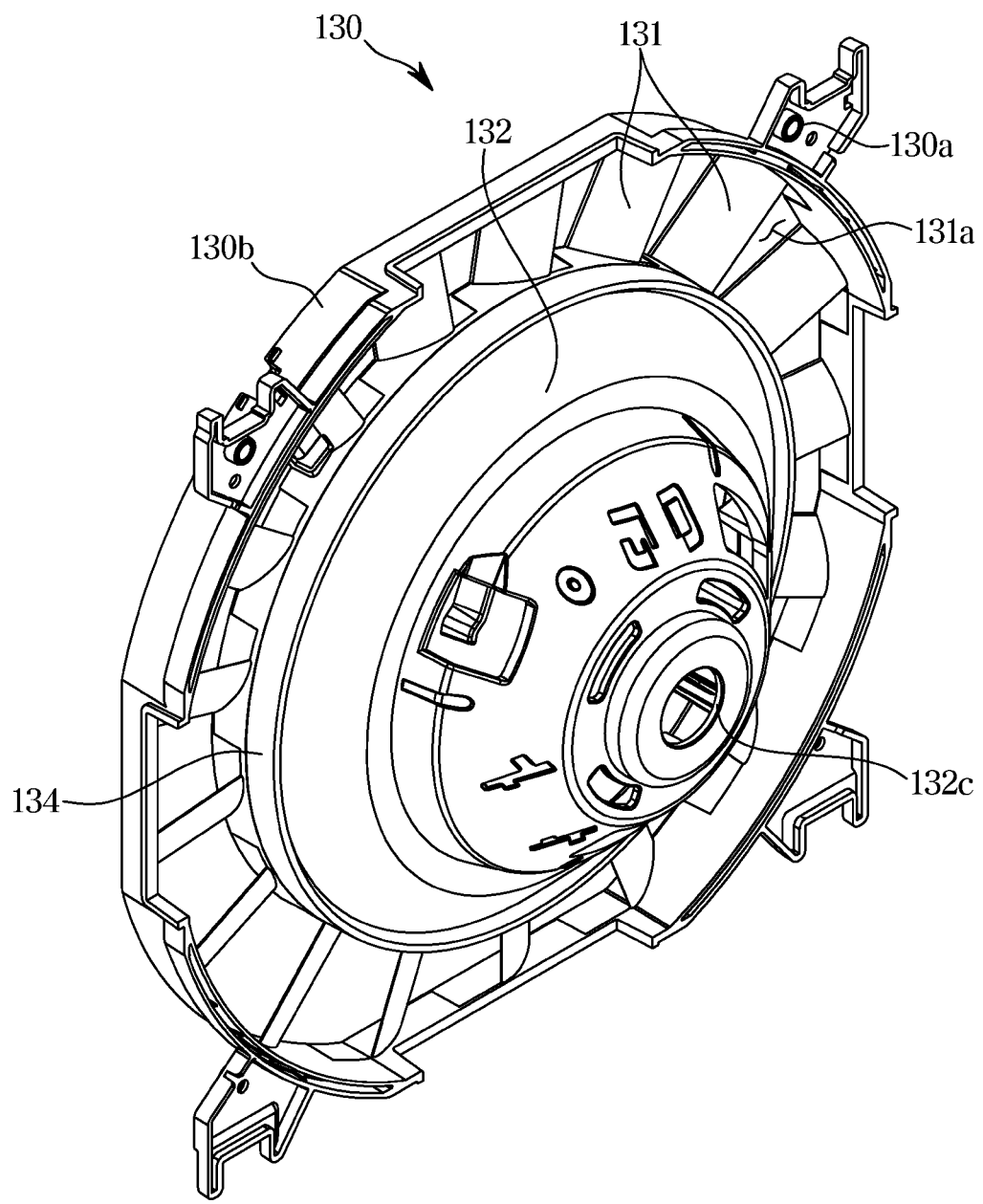
FIG. 5 is a rear perspective view of a cover bracket shown in FIG. 4.
Figure 6:
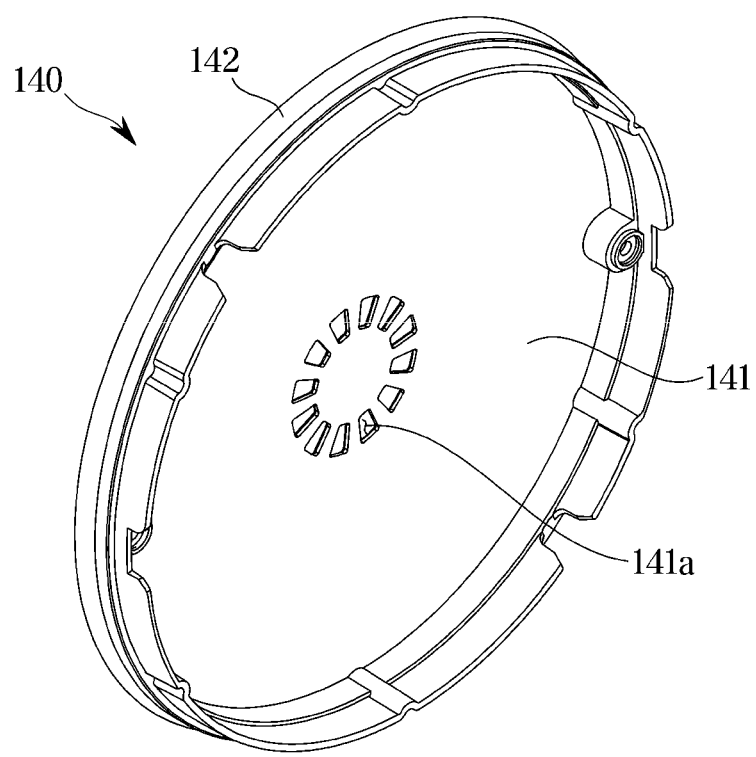
FIG. 6 is a rear perspective view of a cover panel shown in FIG. 4.
Figure 7:
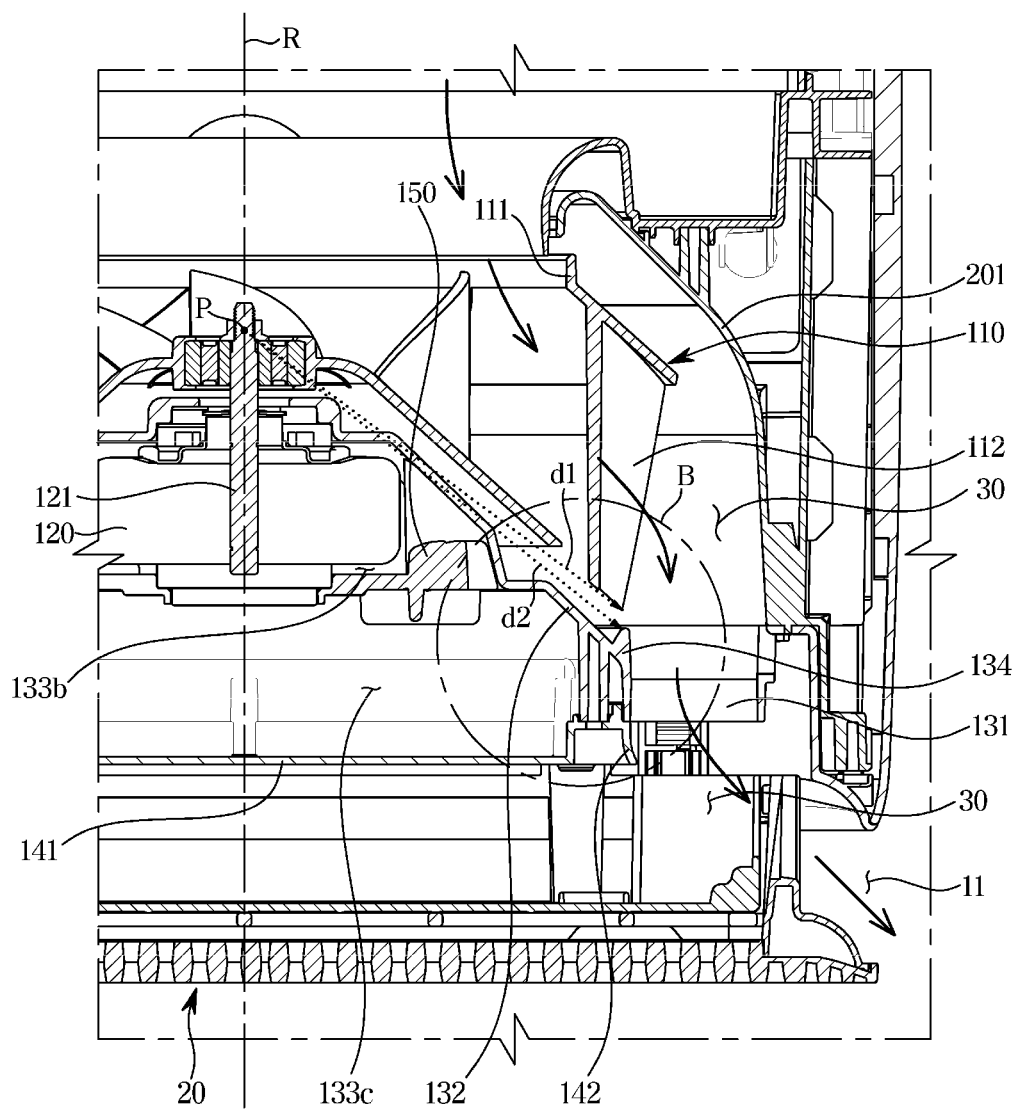
FIG. 7 is an enlarged view of a region A of FIG. 2 through which an airflow moves.
Figure 8:
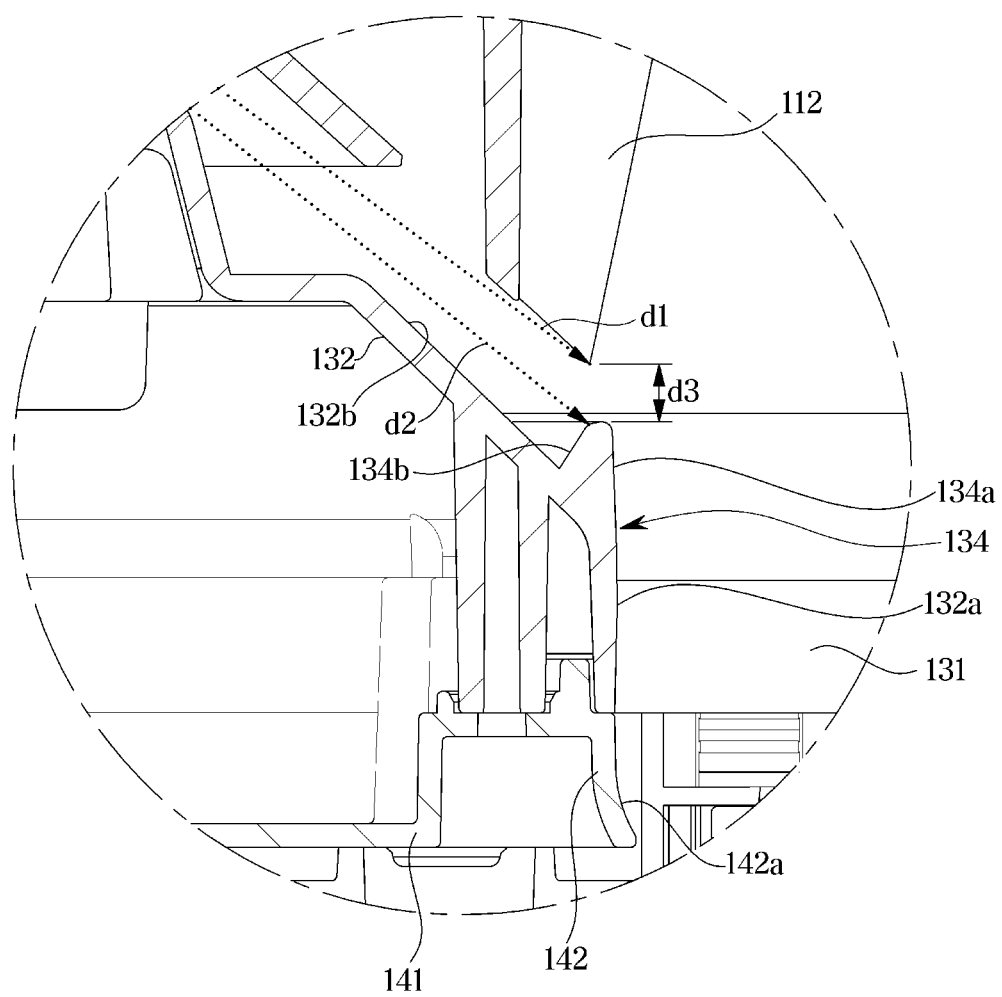
FIG. 8 is an enlarged view of a region B of FIG. 7.

FIG. 4 is an exploded view of a fan assembly shown in FIG. 3. FIG. 5 is a rear perspective view of a cover bracket shown in FIG. 4. FIG. 6 is a rear perspective view of a cover panel shown in FIG. 4. FIG. 7 is an enlarged view of a region A of FIG. 2 through which an airflow moves. FIG. 8 is an enlarged view of a region B of FIG. 7.

Referring to FIGS. 4 to 8, the fan assembly 100 may include a fan 110 configured to form an airflow inside the main body 10, a motor 120 configured to drive the fan 110, and a motor cover 101 in which the motor 120 is accommodated and fixed.

The motor 120 may include a shaft 121, and the shaft 121 may be coupled to the fan 110 to transmit power of the motor 120 to the fan 110. The shaft 121 may extend in the front and rear direction.

The fan 110 may include a rotation axis R parallel to the front and rear direction. The fan 110 may include a mixed flow fan. The fan 110 may include a turbofan. The fan 110 may include a suction port 111 provided to suck air from the rear side. The fan 110 may include a plurality of blades 112. The fan 110 may be configured to discharge air to the front side.

The motor cover 101 may support the fan 110 to allow the fan 110 to be arranged inside the fan case 200. For example, the motor 120 is fixed to the motor cover 101, and the fan 110 is coupled to the motor 120 via shaft 121. The fan case 200 is coupled to the motor cover 101, and the fan 110 may be supported by the motor cover 101.

The motor cover 101 may include a cover bracket 130 coupled to the fan case 200. The cover bracket 130 may include a fixing portion 130a coupled to a front surface of the fan case 200.

The cover bracket 130 may include a body 132 provided to form an accommodation space 133 in which the motor 120 is accommodated, and a plurality of guide vanes 131 provided to protrude from a side surface 132a of the body 132. A cut surface of the body 132 cut by a plane perpendicular to the rotation axis R of the fan 110 may be circular. That is, one cross-section of the body 132 cut by a plane perpendicular to the front and rear direction may be circular. Accordingly, the side surface 132a of the body 132 may correspond to an outer peripheral surface 132a of the body.

The plurality of guide vanes 131 may extend radially from the outer peripheral surface 132a of the body 132.

The plurality of guide vanes 131 may be disposed on a guide flow path 131a corresponding to a portion of the air flow path 30. Particularly, the cover bracket 130 may include an edge wall 130b provided to surround the body 132 and to form the guide flow path 131a together with the body 132. The plurality of guide vanes 131 may be arranged between the body 132 and the edge wall 130b so as to connect the body 132 to the edge wall 130b. Further, the plurality of guide vanes 131 may be arranged on the guide flow path 131a formed between the body 132 and the edge wall 130b. The guide flow path 131a may be formed in a substantially annular shape. The guide vanes 131 may guide the airflow moving toward the outlet 11, and stabilize the airflow, thereby preventing swirling.

The body 132 may have an approximately hollow truncated cone shape. The body 132 may decrease in diameter from the front to the rear. A rear surface 132b of the body 132 may be away from the rotation axis R as the rear surface 132b moves away from the fan 110 in approximately the front and rear direction. The rear surface 132b of the body 132 may form the air flow path 30 together with the inner wall 201. That is, the rear surface 132b of the body 132 may guide the air.

A through hole 132c through which the shaft 121 of the motor 120 passes may be formed on the rear surface of the body 132.

The accommodation space 133 formed by an inner surface of the body 132 may include an opening 133a open toward the front. The opening 133a may be formed by a front end of the body 132. The opening 133a may have a circular shape.

The accommodation space 133 may include a motor accommodating portion 133b in which the motor 120 is accommodated and mounted, and a heat dissipation flow path portion 133c in which the heat generated by the motor 120 is discharged. The motor accommodating portion 133b may be provided in such a way that a rear end thereof is connected to the through hole 132c and a front end thereof is connected to the heat dissipation flow path portion 133c. The heat dissipation flow path portion 133c may be provided in such a way that a rear end thereof is connected to the motor accommodating portion 133b and a front end thereof is connected to the opening 133a.

The motor cover 101 may include a support panel 150 disposed in the accommodation space 133 to support the motor 120 from the front and provided to define the motor accommodating portion 133b and the heat dissipation flow path portion 133c. The support panel 150 may be fixed to the inner surface of the body 132. The support panel 150 may include a communication hole 151 through which the motor accommodating portion 133b and the heat dissipation flow path portion 133c communicate with each other.

The motor cover 101 may include a vortex breaker 134 provided to protrude from the body 132 toward the fan 110 so as to prevent a vortex from being formed by the fan 110. The vortex breaker 134 may be disposed further upstream of the air flow path 30 than the guide vane 131. The vortex breaker 134 may be disposed in front of the fan 110. In front of blade 112 of the fan 100, the vortex breaker 134 may be arranged adjacent to the blade 112.

The vortex breaker 134 may correspond to an annular protrusion extending along the outer periphery of the body 132. An outer surface 134a of the vortex breaker 134 may be connected to the outer peripheral surface 132a of the body 132. The vortex breaker 134 may be formed at a portion in which the rear surface 132b of the body 132 having a side surface shape of a truncated cone is connected to the outer peripheral surface 132a of the body 132 having a side surface shape of a cylinder shape. The vortex breaker 134 may be formed integrally with the body 132 or may be provided separately from the body 132.

An inner surface 134b of the vortex breaker 134 may be an inclined curved surface extending in a radial direction as the inclined curved surface approaches the fan 110 in the front and rear direction. That is, the inner surface 134b of the vortex breaker 134 may be an inclined curved surface that approaches the rotation axis R of the fan 110 as the inclined curved surface moves away from the fan 110 in the front and rear direction.

The vortex breaker 134 may be placed adjacent to the blade 112, which discharges the air toward the front side, to collide with the air, which is discharged by the blade 112, so as to prevent the air discharged by the blade 112 from swirling, thereby preventing the formation of a vortex. In addition, because the vortex breaker 134 includes the inner surface 134b corresponding to the curved surface, the air discharged from the fan 110 may be moved smoothly along the inner surface 134b when colliding with the vortex breaker 134, and thus the air discharged from the fan 110 may be guided toward the guide vane 131.

In order to sufficiently obtain a vortex prevention effect while preventing the collision with the blade 112, a shortest distance d3 in the front and rear direction between the vortex breaker 134 and the blade 112 may be greater than or equal to 2 mm, but less than or equal to 10 mm. Meanwhile, the shortest distance d3 in the front and rear direction between the vortex breaker 134 and the blade 112 may correspond to a shortest distance in the front and rear direction between the vortex breaker 134 and the fan 110.

In order to sufficiently obtain a vortex prevention effect while preventing the collision with the blade 112, a difference between a shortest distance d2 between a coupling portion center P of the shaft 121 and the vortex breaker 134, and a distance d1 between the coupling portion center P of the shaft 121 and one end of the blade 121 adjacent to the vortex breaker 134 may be greater than or equal to 2 mm, but less than or equal to 10 mm. The coupling portion center P of the shaft 121 may correspond to a center of a portion in which the shaft 121 is coupled to the fan 110.

As mentioned above, the vortex breaker 134 may prevent or reduce the formation of the vortex that is formed by the air discharged through the fan 110. Accordingly, it is possible to minimize flow loss and flow noise caused by the vortex.

The motor cover 101 may include a cover panel 140 provided to cover the opening 133a of the accommodation space 133. The cover panel 140 may be removably coupled to the front end of the body 132. The cover panel 140 may be disposed in front of the body 132.

The cover panel 140 may include a plate portion 141 provided to form a front surface of the cover panel 140 and formed in a disk shape, and an annular airflow guide 142 provided to extend along the outer periphery of the cover panel 140 and guide the air, which passes through the guide vane 131, to the outlet 11. That is, the airflow guide 142 may guide the air passing through the cover bracket 130 to the outlet 11.

The airflow guide 142 may be disposed downstream of the air flow path 30 than the guide vane 131. The airflow guide 142 may be disposed in front of the fan 110. The airflow guide 142 may be disposed on the opposite side to the vortex breaker 134 with respect to the guide vane 131.

The airflow guide 142 may be disposed adjacent to the guide vane 131. Because an outer periphery of a rear end of the cover panel 140 is approximately the same as an outer periphery of the front end of the body 132, the airflow guide 142 may be arranged on the outer periphery of the body 132 when the cover panel 140 is coupled to the front end of the body 132.

A width of the airflow guide 142 in the front and rear direction may be greater than or equal to 5 mm to effectively guide the air toward the outlet 11.

The airflow guide 142 may have a bell-mouth shape in which a diameter of a front end thereof is greater than a diameter of a rear end thereof, and the diameter decreases from the front end to the rear end. The airflow guide 142 may include a curved surface 142a corresponding to the outer peripheral surface of the cover panel 140. The curved surface 142a may extend in a radial direction of the plate part 141 as the curved surface 142a moves away from the fan 110 in the front and rear direction. That is, the airflow guide 142 may include the curved surface 142a that moves away from the rotation axis R of the fan 110 as the curved surface 142a moves away from the fan 110 in the front and rear direction.

Because the airflow guide 142 is formed to have a ring shape and includes an outer surface corresponding to the curved surface 142a, the air passing through the guide vane 131 may be moved smoothly along the outer surface 142a and guided to the outlet 11 when colliding with the airflow guide. Accordingly, it is possible to prevent or reduce the formation of the vortex formed by the air passing through the guide vane 131.

The plate portion 141 may shield all or a portion of the opening 133a of the accommodation space 133 to prevent the airflow passing through the guide vane 131 from flowing into the accommodation space 133 of the body 132. The plate portion 141 of the cover panel 140 may include a heat dissipation hole 141a communicating with the heat dissipation flow path portion 133c.

In order to effectively shield the accommodation space 133 of the body 132, the plate portion 141 may cover 75% or more of the area of the opening 133a of the accommodation space 133.

As mentioned above, the plate portion 141 may prevent the airflow passing through the guide vane 131 from flowing into the accommodation space 133, and the airflow guide 142 may effectively guide most of the air, which passes through the guide vane 131, to the outlet 11 and minimize the formation of the vortex. Therefore, an amount of air discharged from the outlet 11 of the air conditioner 1 may be increased and then it is possible to minimize flow loss and noise caused by the vortex.

While the disclosure has been described with reference to example embodiments, it should be understood by those of skilled in the art that various changes in form and details may be made without departing from the spirit and scope of the disclosure.

What is claimed is:

1. An air conditioner, comprising:
   a main body;
   a fan configured to form an airflow inside the main body;
   a motor including a shaft to which the fan is coupled; and
   a motor cover including:
      a body including a rear surface having a truncated cone shape which forms an accommodation space in which the motor accommodated, and
      a vortex breaker which protrudes rearward toward the fan from the rear surface of the body along an outer periphery of the body and has an inner surface which is inclined so that a distance of the inner surface in a radial direction from a rotation axis of the fan increases as the inner surface extends rearward, so as to prevent air, which is discharged from the fan, from forming a vortex.

2. The air conditioner of claim 1, wherein
   the motor cover includes a cover panel coupled to one side of the body to cover the accommodation space, and
   the cover panel includes an airflow guide formed on an outer peripheral side of the cover panel to guide air passing through the vortex breaker to an outlet of the main body.

3. The air conditioner of claim 2, wherein
   the motor cover forms an air flow path to guide air, which is discharged from the fan, to the outlet,
   the motor cover includes a guide vane formed on an outer peripheral surface of the body and disposed on the air flow path so as to stabilize an air flow,
   the vortex breaker is disposed further upstream of the air flow path than the guide vane, and
   the airflow guide is disposed further downstream of the air flow path than the guide vane.

4. The air conditioner of claim 3, wherein
   the vortex breaker and the airflow guide are ring-shaped.

5. The air conditioner of claim 4, wherein
   the guide vane extends in a radial direction from the outer peripheral surface of the body.

6. The air conditioner of claim 4, wherein a shortest distance between the vortex breaker and the fan in a direction parallel to the shaft is greater than or equal to 2 mm, and less than or equal to 10 mm.

7. The air conditioner of claim 6, wherein a difference between a shortest distance between a coupling portion center of the shaft and the vortex breaker, and a distance between the coupling portion center of the shaft and one end of the fan adjacent to the vortex breaker, is greater than or equal to 2 mm, and less than or equal to 10 mm.

8. The air conditioner of claim 4, wherein
   the airflow guide includes a curved surface which extends in a radial direction of the cover panel, and
   the curved surface curves away from the fan with respect to a direction parallel to the shaft.

9. The air conditioner of claim 8, wherein a width of the airflow guide in the direction parallel to the shaft is greater than or equal to 5 mm.

10. The air conditioner of claim 2, wherein
    the cover panel includes a plate portion to cover an opening of the accommodation space, and
    the airflow guide extends along an outer periphery of the plate portion and is connected to the plate portion.

11. The air conditioner of claim 10, wherein
    the accommodation space includes:
       a motor accommodating portion in which the motor is mounted, and
       a heat dissipation flow path portion connecting the motor accommodating portion to the opening to discharge heat generated from the motor, and
    the motor cover includes a support panel in the accommodation space, supporting the motor, and defining the motor accommodating portion and the heat dissipation flow path portion.

12. The air conditioner of claim 11, wherein
    the support panel includes a communication hole through which the motor accommodating portion and the heat dissipation flow path portion communicate with each other, and the cover panel includes a heat dissipation hole formed in the plate portion.

13. The air conditioner of claim 12, wherein the plate portion covers 75% or more of an area of the opening.

14. The air conditioner of claim 3, wherein
the main body further includes a fan case in which the fan is disposed, and
the motor cover is coupled to the fan case.

15. The air conditioner of claim 14, wherein the motor cover forms the air flow path together with the fan case.

* * * * *